United States Patent
Ruell et al.

[11] 3,809,453
[45] May 7, 1974

[54] REDUCED POSITIONAL SENSITIVITY FOR HOLOGRAMS OF ELECTRICAL SIGNALS

[75] Inventors: Hartwig Ruell, Otterfing; Eckhard Storck, Munich, both of Germany

[73] Assignee: Siemens Aktiengesellschaft, Berlin & Munich, Germany

[22] Filed: May 16, 1973

[21] Appl. No.: 360,900

[30] Foreign Application Priority Data
May 18, 1972 Germany............................ 2224386

[52] U.S. Cl......... 350/3.5, 178/6.7 A, 179/100.3 G, 346/108
[51] Int. Cl.................................G02b 27/00
[58] Field of Search........ 350/3.5, 162 SF; 346/108; 179/100.3 G; 178/6.7 R, 6.7 A

[56] References Cited
UNITED STATES PATENTS

| | | | |
|---|---|---|---|
| 3,657,473 | 4/1972 | Corcoran | 350/3.5 |
| 3,758,187 | 11/1973 | Thomas et al. | 350/3.5 |
| 3,703,724 | 11/1972 | Thomas | 350/3.5 |
| 3,586,412 | 6/1971 | Leith | 350/3.5 |
| 3,578,845 | 5/1971 | Brooks et al. | 350/3.5 |

*Primary Examiner*—Ronald J. Stern
*Attorney, Agent, or Firm*—Hill, Sherman, Meroni, Gross & Simpson

[57] ABSTRACT

A method directed to the holographic recording of information in the form of electrical signals on a light sensitive tape or storage medium moving in a feed direction and to the retrieval of information therefrom which method enables a high storage density on the storage medium and is less sensitive to translation of the storage medium during recording and retrieval in a direction transverse to the feed direction. The method accomplishes these features either by converging the object wave to a point while diverging the reference wave from a point or by diverging the object wave from a point while converging the reference wave to the point and by locating the two points on opposite sides of the storage medium in mirror symmetry and offset from an axis passing through the hologram center. In one embodiment of the invention, the points are located with respect to the center of the hologram so that an angle formed by a line extending from one of the points to the center of the hologram and the hologram normal has a tangent which is equal to $\sqrt{2}$. In another embodiment of the present invention, the recording is accomplished with quasi-axially arranged waves utilizing a first wavelength and the reconstruction or retrieval occurs non-axially using a second wavelength which is shorter than the wavelength of the light utilized for recording. In a third embodiment, astigmatic reference and object waves are utilized.

7 Claims, 7 Drawing Figures

REDUCED POSITIONAL SENSITIVITY FOR HOLOGRAMS OF ELECTRICAL SIGNALS

BACKGROUND OF THE DISCLOSURE

1. Field of the Invention

The present invention is directed to a method for holographic recording of information in the form of electrical signals and retrieving the information, which method utilizes a coherent object wave which is pulse modulated according to the electrical signal to be recorded and a coherent reference wave. These waves are superimposed to record one-dimensional holograms on a moving band or tape of light sensitive storage medium.

2. Prior Art

A storage of information in the form of electrical signals on a light sensitive medium for instance a light sensitive band or tape is generally known. An example of such a storage is a sound film wherein speech and music signals are being used for intensity modulating a light source which is projected on a moving film to record the signals on the film in the form of variable blackening or darkening. The above method has also been utilized for recording video signals and thus television broadcasts have been recorded by this method.

It has also been proposed to sequentially record electrical signals in the form of one-dimensional holograms. In such a method, a laser beam is utilized to provide a reference wave and an object wave. The reference wave and the object wave, which object wave has been pulse modulated with the signal to be recorded, are superimposed on a moving recording medium to record a one-dimensional hologram thereon. During a retrieval or reproduction, the band of storage medium is guided past a reference light source to reconstruct the light points of the object wave which are directed onto a detector to induce an alternating current which after appropriate lowpass filtering corresponds to the original signal.

In order to realize the high theoretically possible linear storage density of approximately $10^3$ bits/mm, the resolution of the reconstructed image points has to be as large as possible and thus the diameter of the focal point has to be as small as possible. However, this requirement produces an equally small depth of field of the reconstructed image point and in extreme cases the depth of field is in the magnitude of the wavelength of the laser beam being utilized. Therefore, in order to receive the reconstructed image points separately on the detector, the band of storage medium has to be positioned with respect to the detector and the source of reference light within a $\mu$m in the direction vertical to the feed direction. With high band speeds, such a positioning or guiding of the band of material is extremely difficult.

SUMMARY OF THE INVENTION

The present invention is directed to a method of holographically recording information which is in the form of electrical signals on a storage medium moving in a feed direction with an extremely high storage density and which information can be retrieved or reconstructed with less sensitivity to translation of the storage medium in a direction normal to the feed direction. To accomplish this, the method of recording provides a coherent object wave which is pulse modulated with electrical signals to be recorded, provides a coherent reference wave, directs the object wave and the reference wave to superimpose on a hologram plane to produce a one-dimensional hologram which is recorded on the storage medium with the improvement comprising converging either the reference wave to a point and diverging the object wave from a point or converging the object wave to a point and diverging the reference wave from a point and positioning the points on opposite sides of the moving recording or storage medium to be offset from an axis passing through the center of the hologram and to be in mirror symmetry in relation to the hologram plane. In one embodiment of the method the points are offset from the hologram normal so that an angle formed by the hologram normal and a line extending from one of the points to the center of the hologram has a tangent of $\sqrt{2}$. In another embodiment, the positioning of the points produces a quasi-axial recording utilizing a wavelength $\lambda_1$ and during reconstruction or retrieval, the reference wave is positioned to non-axially retrieve the information utilizing a second wavelength $\lambda_2$ which is shorter than $\lambda_1$. In a third embodiment of the invention, the steps of providing the reference wave and object wave comprises providing astigmatic reference waves and astigmatic object waves with each of the waves having focal lines which are parallel to a feed direction of the moving storage medium which focal lines are located in the same plane parallel to the storage plane and wherein each of the waves have focal lines which are vertical to the feed direction of the storage medium are located on opposite sides of the storage medium in a symmetrical location.

DESCRIPTION OF THE PREFERRED EMBODIMENTS

Figure 1:
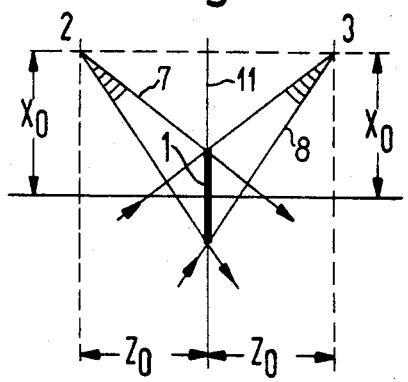
FIGS. 1 and 2 are two schematic arrangements for the performance of the method of the present invention.
Figure 2:
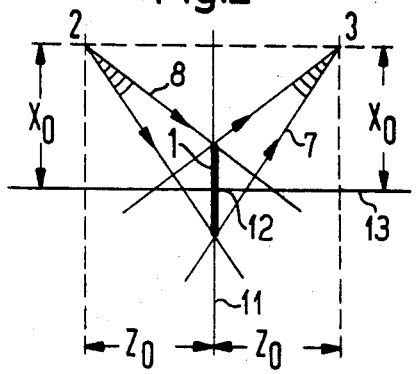

The principles of the present invention are particularly useful in performing a method of recording a hologram 1 on a moving storage medium 11 by using an object wave 7 which has been pulse modulated with the information to be recorded and a reference wave 8. As illustrated in FIG. 1, object wave 7 diverges from a point source 2 which has two-dimensional coordinates $(x_o, -z_o)$ and the reference wave 8 is converging to a point 3 which has two-dimensional coordinates $(x_o, z_o)$. In FIG. 2, a similar hologram 1 is recorded on a storage medium 11 utilizing an object wave 7 which converges to a point 3 and a reference wave 8 which diverges from a point 2.

In both figures, the points 2 and 3 are located on opposite sides of the storage medium 11 and are in mirror symmetry with the hologram plane. The points 2 and 3 are also offset from a line passing through a center 12 of the hologram 1 so that a straight line from the hologram center 12 to either points 2 or 3 forms an angle with the hologram normal 13. Preferably, this angle has a tangent which is equal to $\sqrt{2}$. As illustrated, a distance $r_o$ of either of the points 2 or 3 from a hologram center 12 is determined by the following equation or relationship: $r_o = \sqrt{x_o^2 + z_o^2}$.

Figure 3:
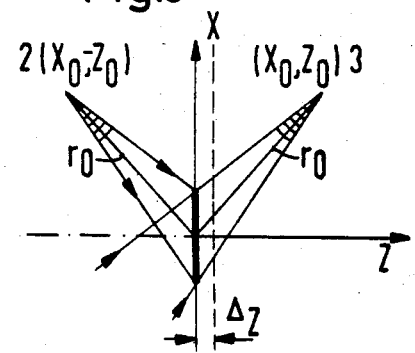
FIG. 3 is a schematic arrangement for a retrieval or reconstruction of the hologram in accordance with the present invention.

In FIG. 3, a schematic arrangement is illustrated for the reconstruction of the hologram 1 which has been recorded in accordance with the method described in FIGS. 1 and 2. The hologram 1 in FIG. 3 is displaced along a z axis by an interval $\Delta z$. The distance of the stored points 2 and 3 from the hologram center 12 remain unchanged, but the spatial reconstructing point source has a new distance $r^1 = \sqrt{x_o^2 + (z_o + \Delta z)^2}$.

The picture point $(x_b, z_b)$ can be determined from the known holographic imaging equation:

$$1/b = 1/g + 1/r - 1/r^1 = 2/r_o - 1/r^1$$

and $$x_b/b = x_o/g + x_o/r - x_o/r^1 = x_o(z/r_o - 1/r^1)$$

with:

$$b = \sqrt{x_b^2 + z_b^2}$$

and:

$$g = r = r_o = \sqrt{x_o^2 + z_o^2}$$

Therein results for the image coordinates $x_b = x_o$ $$z_b = \sqrt{\frac{1}{\left(\frac{2}{r_o} - \frac{1}{r^1}\right)^2} - x_o^2} = \sqrt{\frac{1}{\left(\frac{2}{r_o} - \frac{1}{\sqrt{x_o^2 + (z_o + \Delta z)^2}}\right)^2} - x_o^2}$$

For a small $\Delta z$, one obtains therefrom $$z_b = z_o - \Delta z - (\Delta z)^2/z_o (1 - 3z_o^2/r_o^2) \quad (1)$$

In a first approximation, the hologram shifting $+\Delta z$ is being compensated due to the occurrence of $-\Delta z$ in the equation (1) so that $z_b$ remains unchanged in the spatial coordinate system. In addition to this, the quadratic effect ($\sim (\Delta z)^2$) can be eliminated by means of an additional requirement.

$1 - 3z_o^2/r_o^2 = 0$ that is the specific geometry $x_o/z_o = \sqrt{2}$. (2)

Without consideration of this additional requirement, it could be confirmed experimentally that with a linear storage density of 500 bits/mm, an unchanged reconstruction of a one-dimensional hologram will occur with a shifting of the hologram in a normal direction up to $\Delta z = 75 \mu m$. With a shifting of $\Delta z > 75 \mu m$, a lateral traveling of image points is measurable with the amount of traveling increasing as the $\Delta z$ increases. This is the result of the $(\Delta z)^2$ effect of the movement of the image points. This lateral picture traveling can be made zero by means of fulfilling the additional requirement set forth in Equation 2 so that a band position within an accuracy of $\Delta z > 100 \mu m$ does not produce signal distortions.

The above description is assuming a band position inaccuracy during a picture reconstruction or the retrieval of information contained on the hologram. This same discussion applies to a position inaccuracy or misalignment of the storage medium during the holographic recording. Thus, the positioning or locating of the two points 2 and 3 in mirror symmetry with respect to the hologram during recording and retrieval prevents distortion in the signal being recorded and being retrieved due to translation of the storage medium from the desired position during either recoridng or retrieval.

Apart from this feature of reducing the sensitivity of the reconstructed signal on positioning errors of the storage medium in a normal direction to the hologram plane, picture errors in the hologram which is recorded by the method of the present invention are also considerably reduced. For example, if sequentially superimposed holograms are recorded on the storage medium, during a reproduction or retrieval, a complete picture or image point chain is reconstructed at the same time with the various picture points on the various holograms being spaced from one another. During the reconstruction, the illuminating wave is identical only with one of the recording waves so that only the one desired image point strikes the detector without imaging error while the rest of the points are spaced therefrom. However, the remaining image points can and will disturb the signal pickup when they smear the desired picture outside of the range of the detector so that part of their light strikes the detector too. With holograms, which are recorded with the method according to the present invention, coma and spherical aberrations disappears so that only the unproblematic of astigmatism for one-dimensional recording remains.

In addition the symmetrical recording eliminates the considerable distrubing influence of the gelatic shrinkage of the storage medium which shrinkage has a high influence for high precision or resolution hologram apertures or spot sizes. The surface of maximum exposure across the whole hologram are parallel to the hologram normal, which is arranged in the shrinkage direction so that the thickness changes of the emulsion cannot apply essential influences upon the reconstructed picture.

Figure 4:
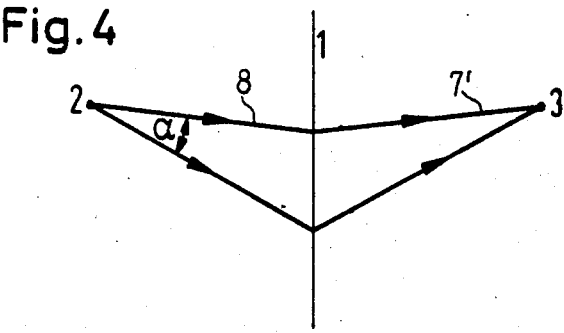
FIG. 4 is a schematic illustration of a non-axial reconstruction in accordance with the present invention.

In FIG. 4, a so-called non-axial arrangement for reconstructing a hologram 1 is illustrated. A reconstructing wave such as a reference wave 8 diverges from a point source 2 with a numerical aperture $\alpha$. The reconstructed wave 7' converges to an image or picture point 3 at which a detector is also arranged for receiving the information from the reconstructed image. The so-called non-axial arrangement of FIG. 4 is defined by the fact that a straight line connecting either point 2 or point 3 to the hologram center forms with the hologram normal such an angle that with a prescribed numerical opening $\alpha$, for the reconstructing wave 8, the undiffracted order of the reconstructed wave does not strike the detector, which is located at the position of the reconstructed picture point 3.

For the utilization of a high storage density, large numerical apertures of the reconstructing light are necessary; however, a non-axial arrangement of the reference and object wave during recording is geometrically very difficult to realize since the object and reference waves cannot be sent through one single lens and the positioning of two lenses next to each other is extremely difficult due to a lack of space.

Figure 5:
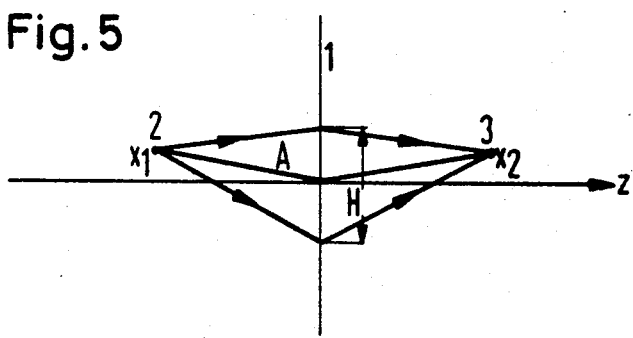
FIG. 5 is a schematic arrangement for quasi-axial recording in accordance with the present invention.
Figure 6:
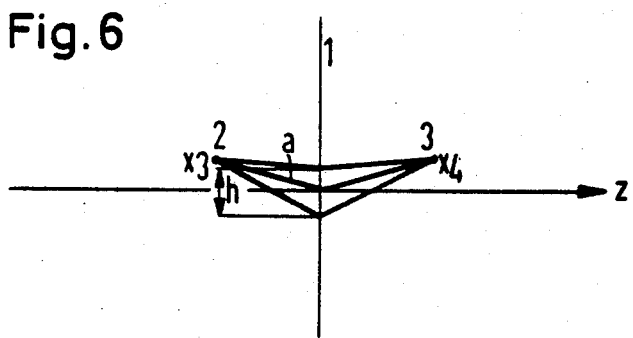
FIG. 6 is a schematic arrangement for the non-axial reconstruction of the hologram recorded quasi-axially as illustrated in FIG. 5.

To overcome this problem, the preferred embodiment of the invention which guarantees the invariant in the storage signal regardless of a translation of the hologram and also provides a large numerical aperture of the reference and object waves during recording and during reconstruction is schematically illustrated in FIGS. 5 and 6. During recording (FIG. 5), one of the two waves, which has a wavelength $\lambda_1$, diverges from point 2 and the other of the two waves converges to point 3. Points 2 and 3 are arranged in mirror symmetry as described hereinabove, with the distance of point 2 from the $z$ axis which passes through the center of the hologram being $x_1$ and the distance of point 3 being $x_2$ and equal to $x_1$. The numerical aperture of the two beams is such that a hologram aperture H is produced and the two points 2 and 3 are a distance A from the center of the holograms. By maintaining the conditions illustrated in FIG. 5, the recording is commonly referred to as a quasi-axially recording of a one-dimensional hologram.

To reconstruct the signals stored in the hologram 1, a non-axial arrangement, which is illustrated in FIG. 6, is utilized. During reconstruction, a reference wave of a wavelength $\lambda_2$ smaller than wavelength $\lambda_1$ diverges from point 2 and is projected on the hologram to reconstruct an image point at point 3 at which the detector is located. Points 2 and 3 are at a distance $x_3$ and $x_4$, respectively, from the $z$ axis which passes through the center of the hologram and have the following relationship to distances $x_1$ and $x_2$: $x_1 = x_2 = x_3 = x_4$. However, the distance of points 2 and 3 from the center of the hologram is a distance a and the hologram size or aperture h during reconstruction is smaller than the hologram size H during recording. In order to accomplish this, the following conditions are required:

$$a/A = \lambda_2/\lambda_1 \text{ and } h/H = (\lambda_2/\lambda_1)^2.$$

When these conditions are maintained, the invariants are guaranteed although there is translations in the $z$ direction as well as tilting of the storage medium during recording or reconstruction. The hologram size $h$, chosen in this way during reconstruction corresponds to the hologram size which delivers with the shorter wavelength $\lambda_2$ without essential imaging errors the same image definition or resolution as the hologram size H during reconstruction with the longer wavelength $\lambda_1$. This condition or requirement is important because only by means of the greater reduction of the proportion of the spot size $h/H$ (that is in proportion to $(\lambda_2/\lambda_1)^2$), with the reduction of the proportion of the distance $a/A$ (that is in proportion to $(\lambda_2/\lambda_1)$), does a quasi-axial arrangement become a non-axial arrangement.

Figure 7:
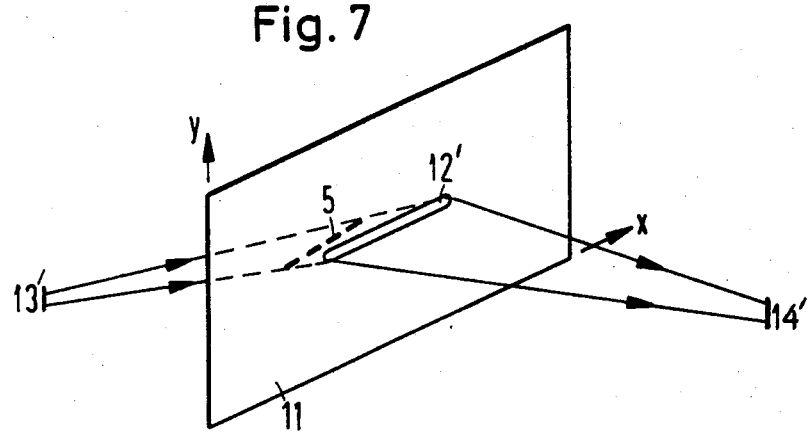
FIG. 7 is a schematic illustration of an arrangement for performing the present invention utilizing astigmatic waves.

To be able to achieve during recording and reconstruction a stored hologram also invariant against translations vertical to the moving direction of the storage medium, astigmatic reference and object waves are used. As illustrated in FIG. 7, a hologram carrier 11 which is moving in direction $x$ has a one-dimensional hologram 12' recorded thereon. As illustrated one of the waves diverges from a focal line 13' which extends vertically to the feed direction $x$ while the other wave converges to a focal line 14' which is disposed on the opposite side from line 13' and which extends vertically to the direction $x$. Both the lines 13' and 14' are symmetrically arranged to the hologram 12'.

To be able to guarantee an invariant of the reconstructed image against translation vertical to the feed direction $x$ of the hologram 12', that is against translation in the $y$ direction, the astigmatic reference wave and the astigmatic object wave being used have focal or image lines 15 which are parallel to the feed direction $x$ and are located to coincide in the same plane which is parallel to the storage medium 11. With this condition, invariants are guaranteed regardless of translation in either the $z$ or $y$ direction. In contrary to this, the storage occurs in the $x$ direction.

For the achievement of a maximum storage density, the focal or images line 15 are placed directly in the plane of the storage medium 11 and coincide. The invariant is then limited by means of the track width which is a magnitude of several $\mu$m.

Although various minor modifications may be suggested by those versed in the art, it should be understood that we wish to employ within the scope of the patent warranted hereon all such modifications as reasonably and properly come within the scope of our contribution to the art.

We claim:

1. In a method for holographically recording of information in the form of electrical signals on a moving storage medium including the steps of moving a light sensitive storage medium, providing a coherent object wave which is pulse modulated with electrical signal to be recorded, providing a coherent reference wave, directing the object wave and reference wave to superimpose at a holographic plane to produce a one-dimensional hologram on the moving storage medium the improvement comprising converging one of the waves to a point and diverging the other of the pair of waves from a point and positioning the two points on opposite sides of the storage medium to be offset from an axis passing through the center of the hologram and to be in mirror symmetry in relation to the hologram plane.

2. In a method according to claim 1, wherein the step of positioning the points creates an angle formed by a line extending from one of the points to the center of the hologram and a hologram normal which angle has a tangent equal to $\sqrt{2}$.

3. In a method according to claim 1, wherein the steps of recording a one-dimensional hologram occurs quasi-axially utilizing a first wavelength $\lambda_1$ and the method further includes reconstructing the holographic image non-axially utilizing a reference wave of a second wavelength $\lambda_2$ which is shorter than $\lambda_1$.

4. In a method according to claim 3, wherein the reference wave during reconstruction of the hologram is controlled to have a spot size h on the hologram plane which is smaller than the spot size H of the object and reference waves on the hologram plane during recording, said spot sizes having the following relationship $h/H = (\lambda_2/\lambda_1)^2$.

5. In a method according to claim 1, wherein the steps of providing the reference and the object waves comprises providing an astigmatic reference wave and providing an astigmatic object wave, each of said waves having focal lines which are parallel to the feed direction of the moving storage medium which focal lines are located in a single plane which is parallel to the storage plane and wherein each of said waves have focal lines which are vertical to the feed direction of the storage medium and are located on opposite sides of the storage medium in a symmetrical location.

6. In a method according to claim 5, wherein the focal lines which are parallel to the feed direction of the storage medium are located in the hologram plane and coincide.

7. In a method according to claim 5, wherein the focal lines which are parallel to the feed direction are located outside of the hologram plane and coincide.

* * * * *